United States Patent

Wise et al.

[11] Patent Number: 4,642,643
[45] Date of Patent: Feb. 10, 1987

[54] NOISE JAMMER DISCRIMINATION BY NOISE SPECTRAL BANDWIDTH

[75] Inventors: Carl D. Wise, Severna Pk.; Frank W. Hays, Ellicott City, both of Md.

[73] Assignee: The United States of America as represented by the Secretary of the Air Force, Washington, D.C.

[21] Appl. No.: 618,288

[22] Filed: Jun. 7, 1984

[51] Int. Cl.[4] .............................................. G01S 7/36
[52] U.S. Cl. .................................................... 342/14
[58] Field of Search ............ 343/18 E, 55 A, 17.1 PF

[56] References Cited

U.S. PATENT DOCUMENTS

| | | | |
|---|---|---|---|
| 2,897,442 | 7/1959 | Wright et al. | 324/77 |
| 3,215,934 | 11/1965 | Sallen | 324/77 |
| 3,321,759 | 5/1967 | Freedman | 343/17.2 |
| 3,660,844 | 5/1972 | Potter | 343/18 E |
| 3,919,707 | 11/1975 | Evans | 343/5 DP |
| 3,922,676 | 11/1975 | O'Berry et al. | 343/17.1 PF |
| 3,924,182 | 12/1975 | Jensen | 324/77 R |
| 4,143,375 | 3/1979 | Knopf | 343/18 E |
| 4,170,009 | 10/1979 | Hamer | 343/18 E |
| 4,209,835 | 6/1980 | Guadagnolo | 364/715 |
| 4,217,580 | 8/1980 | Lowenschuss | 343/77 R |
| 4,241,889 | 12/1980 | Schwellinger et al. | 244/3.15 |
| 4,307,400 | 12/1981 | Miley | 343/18 E |
| 4,328,497 | 5/1982 | Vale | 343/18 E |
| 4,369,445 | 1/1983 | Evans et al. | 343/18 E |

Primary Examiner—Thomas H. Tarcza
Assistant Examiner—David S. Hayes Jr.
Attorney, Agent, or Firm—Richard J. Donahue; Donald J. Singer

[57] ABSTRACT

A method for distinguishing between multiple noise jammer sources having different noise spectral bandwidths. Noise signals are detected over a relatively narrow detection bandwidth. The percent of time that the jammer spectral noise is within the fixed detection bandwidth is used to estimate the jammer spectral bandwidth.

3 Claims, 2 Drawing Figures

NOISE JAMMER DISCRIMINATION BY NOISE SPECTRAL BANDWIDTH

STATEMENT OF GOVERNMENT INTEREST

The invention described herein may be manufactured and used by or for the Government for governmental purposes without the payment of any royalty thereon.

BACKGROUND OF THE INVENTION

The present invention concerns a method for differentiating between multiple noise jammer sources. More particularly, the present invention concerns a method for differentiating between multiple noise jamming sources in instances where two or more radar platforms are used to triangulate on the jamming sources for the purpose of ascertaining their precise locations.

Noise jammer discriminant measurements are difficult to make for several reasons. First, the wide bandwidth of the noise jammer signal transmissions proves difficult for the narrow bandwidth receivers required to operate with narrow beamwidth antennas. Further, the noise-like nature of the jammer transmissions is difficult to characterize in a receiver. Finally, the wide band jammer transmissions contain very little information. Such transmissions are similar to a spread spectrum signal where the entire spectrum must be received and demodulated to acquire any information.

When two or more surveillance radar platforms attempt to triangulate on multiple aircraft carrying noise jammers, the intersections of the noise strobes produce ghost positions which cannot be distinquished from actual aircraft positions. The problem is eased somewhat by geometric considerations but in the presence of numerous jammers, accurate position information (sufficient to vector interceptor aircraft) cannot be acquired.

It is therefore an object of the present invention to specify a method according to which it is possible to differentiate between multiple noise jammer sources.

It is a further object of the present invention to provide a method for distinguishing between noise jammer sources having different noise spectral bandwidths.

It is another object of the present invention to provide a method for accurately locating the positions of multiple aircraft carrying noise jammer sources.

SUMMARY OF THE INVENTION

The solution in accordance with the invention involves a method wherein the relative noise bandwidth (NBW) of the several noise jammer sources is determined. This enables the radars or other receivers to distinquish between wide and narrow bandwidth jammers and to distinquish between multiple wide or narrow bandwidth jammers of significantly different bandwidths. It also relieves the aforementioned ghosting problem and when used with other methods of discriminating noise strobes, improves the tracking of noise jammers.

The novel method involves the detection of noise signals emitted by a selected noise jammer source by means of a receiver having a narrow bandwidth relative to the bandwidth of the noise pulses. Each time the noise signal sweeps through the receiver bandwidth, a pulse is formed at the output of the receiver. The average width of a number of such pulses and the average pulse period of a number of pulse periods is measured and the average duty cycle of the pulses is established by dividing the average pulse width by the average pulse period. Knowing the average duty cycle of the pulses and the receiver bandwidth, it is possible to characterize the noise spectral bandwidth and thereby identify a particular noise jammer source.

While the method disclosed herein is effective in most instances to distinquish between noise jammer sources, it is not presented as the total solution to this complex problem. In this regard a wider variety of situations might be accommodated by the additional use of the method of noise jammer detection based upon modulation differences, as disclosed by the present inventors and T. K. Lisle in a related patent application entitled Noise Jammer Discrimination by Noise Modulation Bandwidth, having Ser. No. 618,287 and filed concurrently herewith.

For a better understanding of the present invention together with other objects, features, and advantages of the invention not specifically mentioned, references should be made to the accompanying drawings and following description, while the scope of the invention will be pointed out in the appended claims.

BRIEF DESCRIPTION OF THE DRAWINGS

Referring to the drawings.

DESCRIPTION OF THE PREFERRED EMBODIMENT

Figure 1:
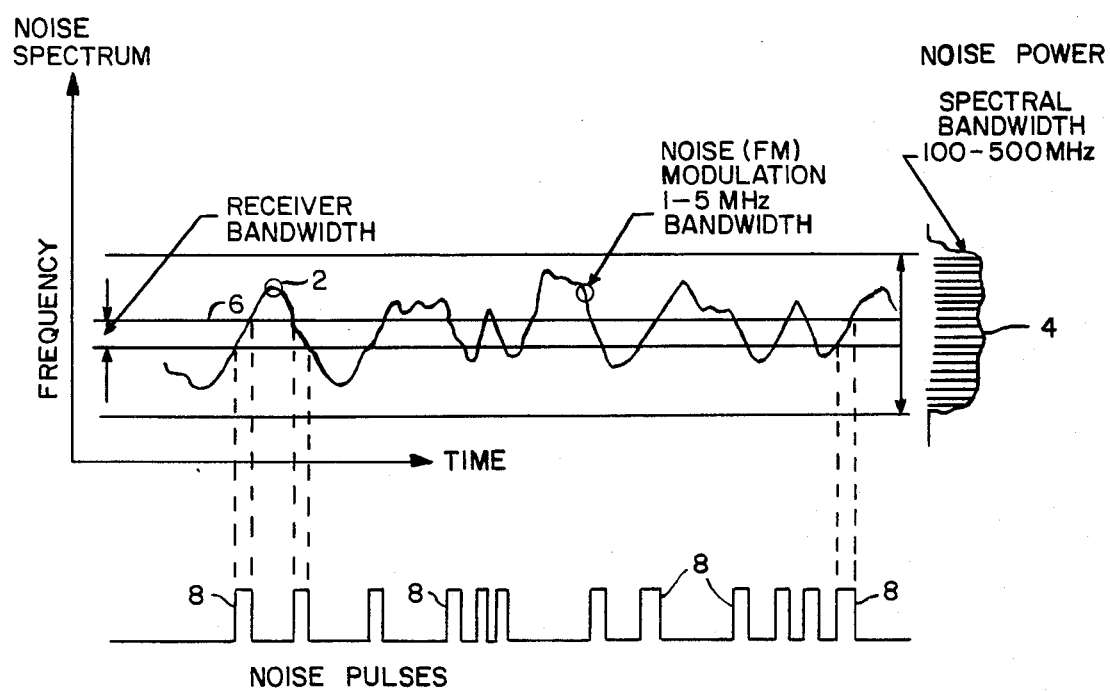
FIG. 1 is an illustration of the duty cycle discriminant for determining the noise bandwidth.

Referring now to FIG. 1, there is shown the duty cycle discriminant for determining the noise bandwidth of a particular jamming source. Jammer noise spectra may vary in width over a wide range depending on the type system to be jammed. This spectrum is actually comprised of a narrow noise modulation bandwidth 2 which is swept over the noise spectrum bandwidth 4 in some manner. If the noise spectrum bandwidth 4 exceeds the narrow bandwidth 6 of a narrow band receiver, each time the noise sweeps through the receiver bandwidth, a noise pulse is generated in the receiver.

A series of such noise pulses 8 are shown whose pulse width is determined by the length of time the noise signal remains within the receiver bandwidth. By measuring the average duty cycle of the noise pulse and knowing the receiver bandwidth, a unique measurement characteristic of the noise spectral bandwidth can be made.

Since both the receiver bandwidth and noise signal duty cycle are now known, an estimate of the noise spectral bandwidth is possible. This assumes a relatively uniform spectral density which noise jammers attempt to achieve in order to improve their effectiveness.

Figure 2:
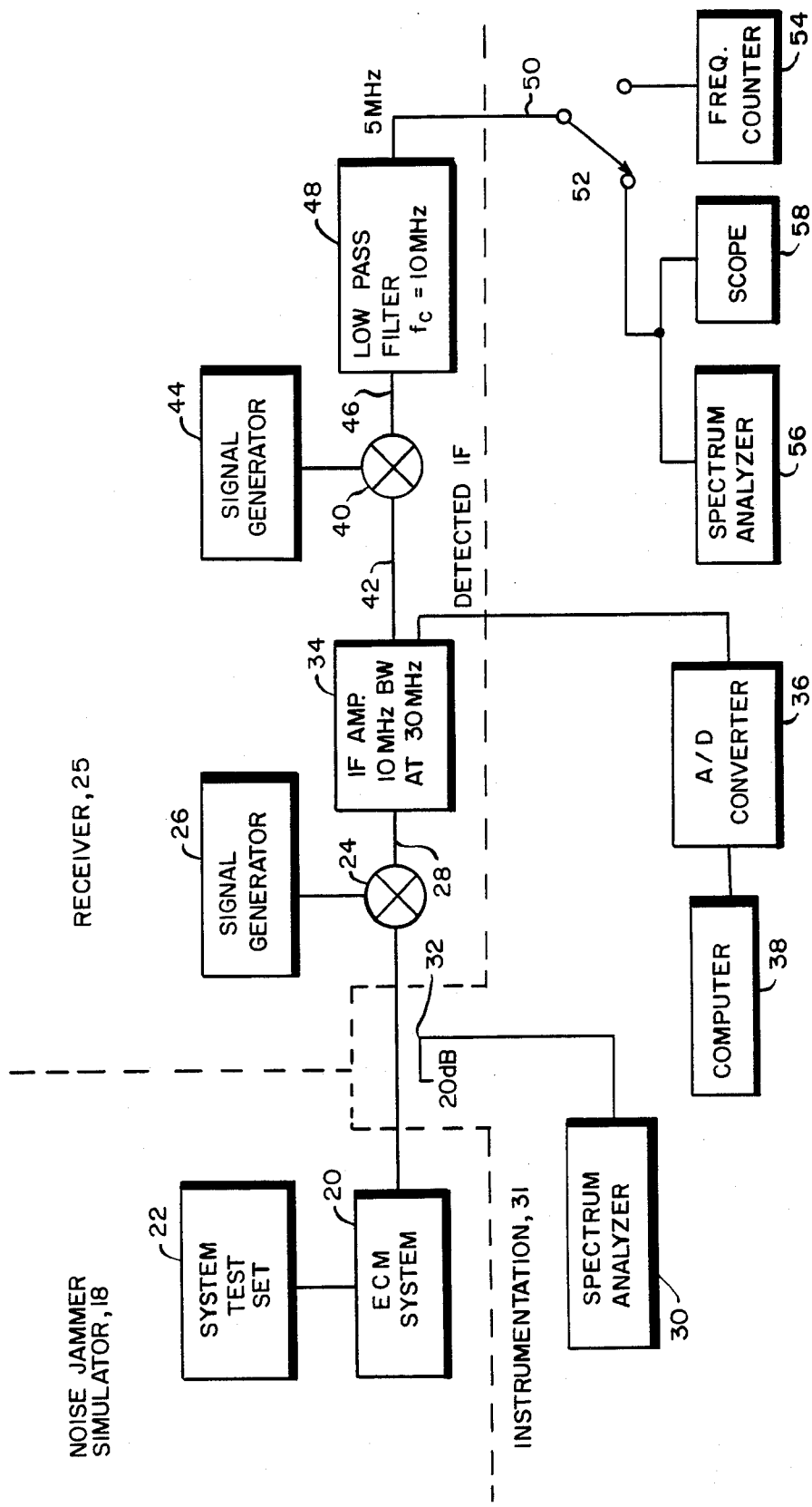
FIG. 2 is a block diagram representation of apparatus for simulating noise jammer signals of different bandwidth and for evaluating the method of the present invention.

FIG. 2 depicts, in block diagram form, apparatus for simulating noise jammer sources of different noise signal bandwidth, for receiving signals therefrom, and for determining the duty cycle of pulses formed each time the noise signal sweeps through the bandwidth of the receiver. In this apparatus, simulated noise jammer signals are generated by a noise jammer simulator 18, consisting of an ECM (electronic countermeasure) system 20 under control of a system test set 22. Test set 22 determines the type of noise modulation and noise spectral bandwidth emitted from the ECM system 20 and applied to one input of a mixer 24 associated with the receiver 25 of FIG. 2. Mixer 24 also receives as an input, signals from signal generator 26 which down-converts the RF signal from ECM system 20 to an intermediate frequency on output lead 28. A spectrum analyzer 30 shown in the instrumentation section 31 monitors the RF signal and is coupled to the output of the ECM system 20 by means of a 20 dB coupler 32.

The intermediate frequency on output lead 28 is coupled to the input of an IF amplifier 34 having a 10 MHz bandwidth centered at 30 MHz. The detected output signal from IF amplifier 34 is applied to an analog to digital converter 36 and is recorded by computer 38. The intermediate frequency output signal from IF amplifier 34 is coupled to a second mixer 40 via lead 42. Mixer 40 also receives an input signal from signal generator 44 to provide an output signal on lead 46, again down-converted in frequency. This output signal is applied to low pass filter 48, having a center frequency of 5 MHz and an upper frequency cutoff of 10 MHz. The output signal therefrom on lead 50 is applied to the arm of a single pole-double throw switch 52 where it is applied to either a frequency counter 54, or to a spectrum analyzer 56 and oscilloscope 58. Spectrum analyzer 56 and oscilloscope 58 are included to provide visual displays of the signals, if desired. Counter 54 is used to determine the duty cycle of the noise jamming signal, as it slews in and out of the bandpass of the receiver, as will be described later herein.

During testing of the invention, the noise spectral bandwidth of noise pulses controlled by system test set 22 was varied from forty times the determined bandwidth of receiver 25 to a value equal to the receiver bandwidth. Good correlation was observed between the noise spectral bandwidth and the duty cycle out of the receiver 25 as measured by the counter 54 and tabulated below.

| Spectral NBW | Counter Reading - (1 MHZ NMBW) | (3 MHz NMBW) |
|---|---|---|
| 400 MHz | .87 MHz | .80 MHz |
| 300 MHz | 1.28 MHz | 1.27 MHz |
| 200 MHz | 1.88 MHz | 1.94 MHz |
| 50 MHz | 2.74 MHz | 2.68 MHz |
| 25 MHz | 3.17 MHz | 3.15 MHz |
| 10 MHz | 4.73 MHz | 4.99 MHz |

In these measurements, counter 54 recorded the number of cycles, of a 5 MHz reference frequency signal out of low pass filter 48. The 5 MHz center frequency signal out of low pass filter 48 only occurs when the noise spectral modulation is within the 10 MHz passband of the receiver established by the bandwidth of I.F. Amplifier 34 and low pass filter 48. The ratio between the counter readings and the 3 MHz reference reflects the duty cycle of the noise signal in the receiver. By way of examples, since the center frequency of the signal out of low pass filter 48 is established to be 5 MHz, if counter 54 counts 5 MHz, then the noise signal must be within the receiver bandwidth for 100 percent of the time, i.e., the duty cycle of the noise spectral modulation is 100 percent. However, if counter 54 counts a lower number, then the duty cycle of the noise spectral modulation is less than 100 percent. A count of 4 MHz, for instance, would represent a duty cycle of 80 percent. It will be noted that the duty cycle is substantially independent of different noise modulation bandwidths (NMBW).

As previously mentioned, the ability to distinquish between the spectral bandwidths of noise jammers enables surveillance radars to eliminate a significant amount of ghosting problems when triangulation is used to track targets. Distinquishing between wide and narrow bandwidth jammers can also help determine their mission, i.e., bomber escort, fighter self-defense, stand-off, etc.)

Clearly, many modifications and variations of the present invention are possible in light of the above teachings and it is therefore understood, that within the inventive scope of the inventive concept, the invention may be practiced otherwise than specifically claimed.

What is claimed is:

1. A method of distinguishing between multiple noise jammer sources having different noise spectral bandwidths comprising the steps of:
   (a) detecting noise signals emitted by a selected noise jammer source by means of a receiver having a narrow bandwidth compared to the potential minimum spectral bandwidth of said noise signals;
   (b) forming noise pulses as said noise signals from said noise jammer source sweep through the bandwidth of said receiver;
   (c) determining the average duty cycle of said noise pulses; and
   (d) characterizing the noise spectral bandwidth from said duty cycle and from the known bandwidth of said receiver to uniquely identify said selected noise jammer source.

2. A method of distinquishing between multiple noise jammer sources having different noise spectral bandwidths comprising the steps of:
   (a) detecting noise signals emitted by a selected noise jammer source within a noise detection bandwidth narrower than the potential minimum spectral bandwidth of said noise jammer source;
   (b) forming noise pulses as said noise signals from said selected jammer source sweep through said noise detection bandwidth;
   (c) determining the average duty cycle of said noise pulses; and
   (d) characterizing the noise spectral bandwidth from said duty cycle and from said noise detection bandwidth to uniquely identify said selected noise jammer source.

3. A method of distinquishing between noise jammer sources as defined in claim 2 wherein:
   said noise detection bandwidth is selected to be less than one half of said potential minimum spectral bandwidth of said noise jammer source.

* * * * *